United States Patent [19]

Clay et al.

[11] 4,130,338
[45] Dec. 19, 1978

[54] HOLOGRAM HAVING EXPANDED VIEWING AREA

[75] Inventors: Burton R. Clay, Wayland; Douglas A. Gore, Billerica, both of Mass.

[73] Assignee: RCA Corporation, New York, N.Y.

[21] Appl. No.: 871,761

[22] Filed: Jan. 23, 1978

Related U.S. Application Data

[63] Continuation of Ser. No. 714,360, Aug. 16, 1976, abandoned.

[51] Int. Cl.² .......................... G03H 1/16; G03H 1/32
[52] U.S. Cl. .................... 350/3.82; 350/3.81; 350/3.86
[58] Field of Search .................. 350/3.81, 3.82, 3.85, 350/3.86

[56] References Cited

U.S. PATENT DOCUMENTS

| 3,523,054 | 8/1970 | Heflinger et al. | 350/3.81 |
| 3,640,599 | 2/1972 | vanLigten | 350/3.81 |
| 3,659,914 | 5/1972 | Brooks | 350/3.81 |
| 3,677,616 | 7/1972 | Lewis | 350/3.81 |
| 3,749,469 | 7/1973 | Gayeski | 350/3.82 |
| 3,756,684 | 9/1973 | Fox | 350/3.82 |
| 3,770,340 | 11/1973 | Cronin et al. | 350/3.81 |
| 3,785,712 | 1/1974 | Hannan | 350/3.82 |

*Primary Examiner*—Ronald J. Stern
*Attorney, Agent, or Firm*—H. Christoffersen; Samuel Cohen; George J. Seligsohn

[57] ABSTRACT

The use of a lenticular array in the formation of the object-illuminating beam used in the recording of either a Fresnel, a Fraunhofer or an image plane hologram, permits the reconstructed image of the object, on playback of the hologram, to be directly viewed over an expanded image viewing area.

5 Claims, 4 Drawing Figures

HOLOGRAM HAVING EXPANDED VIEWING AREA

This is a continuation, of application Ser. No. 714,360, filed 8-16-76, now abandoned.

This invention relates to an improved technique for recording a hologram of an object which, on playback, permits the reconstructed image of the object to be directly viewed over an expanded image viewing area.

Although it has long been known that a holographically reconstructed image may be directly viewed by an observer, most practical holographic playback systems do not provide for such direct observation of the reconstructed image. The reason for this is that direct observation of a holographic reconstructed image is possible only from a limited eye-position viewing area. Should the observer move his head to a position not included within this area, the image would be vignetted. Because this viewing area is usually too small for practical applications, current practice is to employ a diffusing projection screen in the hologram playback system to effectively enlarge the image viewing area. In particular, the real image is made incident on a diffusing projection screen so that the image distribution is scattered into a field depending on the screen characteristics. (Holograms may be recorded so as to yield either real or virtual images. If the hologram is such as to produce a virtual image, the virtual image may be converted to a real one by passing the light through a suitable optical system.)

While a diffusing projection screen does provide means for enlarging the viewing area of the reconstructed hologram image, there are several disadvantages in using a diffusing projection screen. First, a diffusing projection screen (even when made with a controlled diffusion angle) not only scatters the image light into the correct viewing area, but also scatters ambient light into the observer's viewing position, which has the effect of lowering contrast. Second, if the diffusing projection screen uses random diffusion centers, (as is the case with ground glass, beaded screens or controlled diffusers), then the image acquires the texture of the screen (this is especially bad if temporally coherent light is used to read out the hologram since speckle is produced). Third, a controlled diffusion angle projection screen is expensive to both design and fabricate. This is especially true in the case of a lenticular, controlled diffusion projection screen, because of the difficulty in producing sufficiently high pitches to satisfy resolution requirements with good overall uniformity. For this reason, such lenticular projection screens are rarely used.

The present invention is directed to a technique for expanding the eye-position viewing area without recourse to screens of any kind. Briefly, this is accomplished by modifying the object-illuminating beam used in the recording of the hologram with a lenticular lens array having a suitable pitch and focal length to provide a group of spaced point light sources, each of which provides a separate divergent object-illuminating beam component. The lenticular lens array occupies an area sufficiently large to provide desired eye freedom. Such a recorded hologram may be conventionally played back to reconstruct an image which may be directly observed over a viewing area of sufficient size for practical applications.

These and other features and advantages of the present invention will become more apparent from the following detailed description taken together with the accompanying drawing, in which:

FIG. 2a shows a modification of the arrangement of FIG. 2 for playing back the Fraunhofer hologram of FIG. 1a.

Figure 1A:
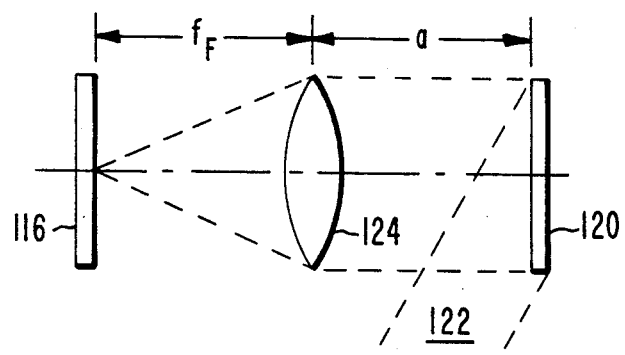
FIG. 1a shows a modification of the embodiment of FIG. 1 for recording a Fraunhofer hologram.
Figure 1:
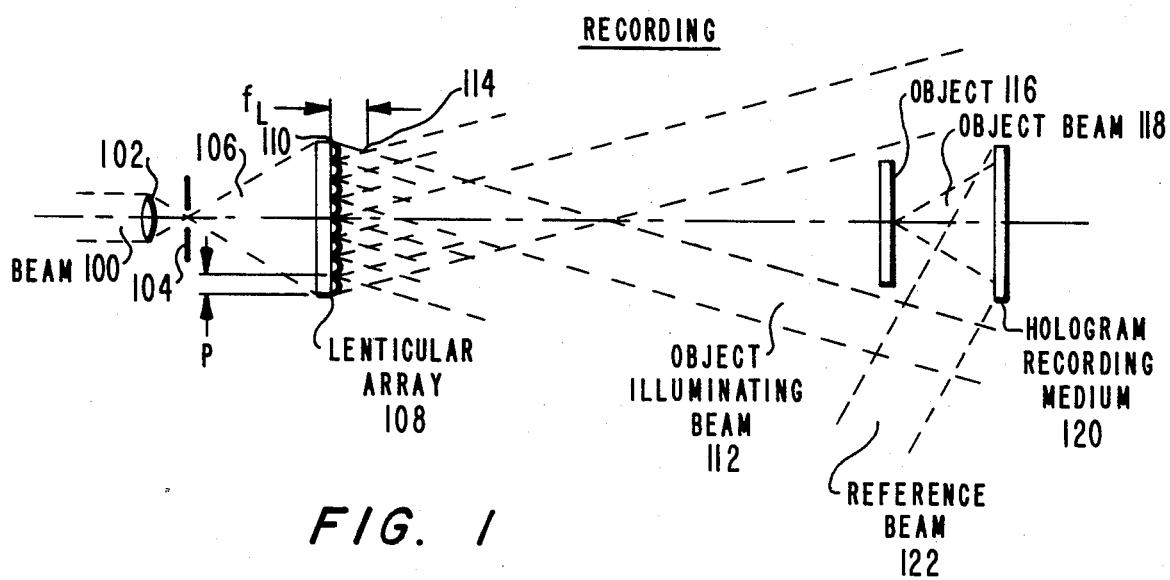
FIG. 1 shows an embodiment of the present invention for recording a Fresnel hologram.

Referring now to FIG. 1, a beam of coherent light 100 is passed through a beam-expander consisting of lens 102 and pinhole mask 104 to form diverging beam 106. Diverging beam 106 is incident on lenticular array 108. Lenticular array 108 is formed of a plurality of contiguous lenticules, such as lenticule 110 regularly disposed at a pitch P over a predetermined area. As shown in FIG. 1, each of the lenticules, such as lenticule 110, has a focal length $f_L$.

The light emerging from lenticular array 108 forms object illuminating beam 112. As shown in FIG. 1, each of the lenticules, such as lenticule 110, of lenticular array 108 gives rise to an individual component of object illuminating beam 112, which forms a point source of light at the focal point of that particular lenticule of lenticular array 108, such as focal point 114 of lenticule 110.

The illumination of object 116, which may be a picture transparency, with object illuminating beam 112 gives rise to object beam 118, which illuminates a surface area of hologram recording medium 120.

In a manner known in the art, a reference beam 122 of light which is mutually coherent with beam 100 illuminates this surface area of hologram recording medium 120 simultaneously with the illumination thereof by object beam 118. In this manner, a Fresnel hologram is recorded on the surface area of hologram recording medium 120. Reference beam 122 may have a plane wavefront shape or may have any other predetermined wavefront shape.

As shown in FIG. 1a, a Fraunhofer hologram, rather than a Fresnel hologram, may be recorded by disposing a suitable Fraunhofer lens, having a focal length $f_F$, intermediate object 116 and hologram recording medium 120, with object 116 being situated in the front focal plane of lens 124 and hologram recording medium 120 being situated at a distance a behind lens 124. The distance a may be less than, equal to or greater than the focal length $f_F$. However, in the case where a is made equal to $f_F$, the recorded hologram becomes a Fourier transform type of hologram.

Figure 2A:
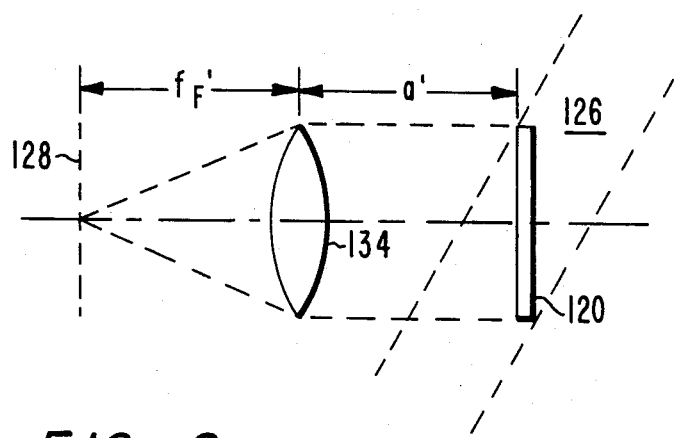
Figure 2:
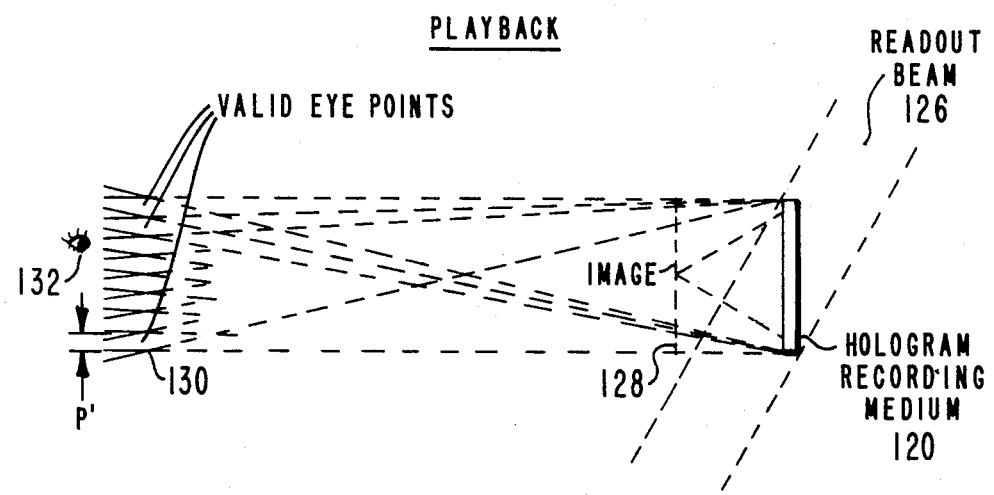
FIG. 2 shows an arrangement for playing back the Fresnel hologram of FIG. 1.

As shown in FIG. 2, the Fresnel hologram recorded on hologram recording medium 120 by the arrangement shown in FIG. 1 is played back in a conventional manner by illuminating hologram recording medium 120 with a readout beam 126 of coherent light, which may have the same wavelength as and a direction and wavefront shape which is the conjugate of reference beam 122 used in recording the hologram. (As known in the art, a readout beam of coherent light of different wavelength from that of reference beam 122 may be used by suitably changing the angle of orientation of readout beam 126 with respect to hologram recording medium 120, although this results in a change in the size (magnification) of reconstructed image.)

In any event, if a Fresnel hologram recorded by the arrangement shown in FIG. 1 is illuminated by readout beam 126, one of the first diffraction orders of light emerging from hologram recording medium 120 gives rise to a reconstructed real image of the pictorial information defined by object 116, in a manner known in the art. This first diffraction order of light comprises a background term (spatial carrier) spatially modulated by the object pictorial information spatial frequencies. Because of the effect of lenticular array 108 on the formation of object illuminating beam 112 in FIG. 1, the background term of the first diffraction order converges to a multiplicity of spaced points, such as point 130, each of which corresponds to the point source, such as point source 114, produced by each individual lenticule, such as lenticule 110 of lenticular array 108. The pitch P' of the background term convergent point, such as point 130, depends upon the pitch P of lenticular array 108 as well as the respective wavelengths of the light employed in recording the hologram and in playing back the hologram. When the wavelength of the recording light and playback light is the same, the pitch P' is equal to the pitch P. In any case, if P is made sufficiently small so that P' is less than the diameter of the pupil of the light-adapted eye, eye 132 of an observer situated in proximity to the background term convergence point, such as point 130, intercepts at least two points at all times. So long as the pupil of the eye 132 of the observer intercepts all the light from any one of the points, such as point 130, his eye intercepts all of the background term (i.e., he will see the whole image field of view). Since the pitch P' is such that at least two points are intercepted at all times, no transition modulation arises as the eye sweeps across the entire viewing area defined by all of the points, such as point 130. This provides an expanded image viewing area providing for eye freedom in directly observing image 128.

The focal length $f_L$ of each lenticule, such as lenticule 110, of lenticular array 108 is determined by the cone angle subtended from the lenticule focal point to the object area at the working distance selected. This cone angle is made sufficiently small so that all of the background term is intercepted, so that the whole reconstructed image is within the field of view of the observer. By way of example, lenticular array 108 may have a pitch P of one per millimeter and a focal length $f_L$ of 3 millimeters. Further, the recording and playback wavelengths of light are the same in the embodiment shown in FIGS. 1 and 1a, so that the pitch P' between background convergence points, such as point 130, is also one per millimeter.

As shown in FIG. 2a, in the case of a recorded Fraunhofer hologram, an imaging lens 134, having a focal length $f'_F$, is situated at a distance a' from hologram recording medium 120 in the path of the first refraction order of light emerging from the Fraunhofer hologram illuminated with readout beam 126. This results in a reconstructed image 128 being formed in the back focal plane of image lens 134, in a manner known in the art. Preferably $f'_F$ is equal to $f_f$ and a' is equal to a, although this is not essential. In all other material respects, the playback of a Fraunhofer hologram employing the principles of the present invention is the same as that previously described for the playback of a Fresnel hologram.

What is claimed is:

1. A method for directly viewing over an expanded image viewing area the reconstructed image of a holographically recorded object played back with a readout beam of light of preselected wavelength; said method comprising the steps of:

holographically recording said object with a set of diverging object illuminating beams of coherent light of given wavelength respectively derived from an array of spaced point sources of light distributed at a first pitch distance over a given area, every one of said object illuminating beams illuminating said entire object, playing back said holographically recorded object with said readout beam to derive a set of background first diffraction order beams of light that individually converge to a multiplicity of spaced background term convergence points corresponding to said array of point sources, said multiplicity of background term convergence points being distributed at a second pitch distance which is determined by said first pitch distance and the ratio of said preselected to said given wavelengths, and specifying said first pitch distance at a value at which said second pitch distance is less than the diameter of the pupil of the light-adjusted eye of an observer, whereby each background term convergence point constitutes a separate valid eye point of an expanded image viewing area, and an individual image of said object is directly viewable by the eye of an observer in proximity to any valid eye point.

2. The method defined in claim 1, wherein said step of holographically recording comprises the step of recording said object as a Fresnel hologram.

3. The method defined in claim 1, wherein said step of holographically recording comprises the step of recording said object as a Fraunhofer hologram.

4. The method defined in claim 1, wherein said second pitch distance is substantially 1 millimeter.

5. The method defined in claim 4, wherein the convergence angle of each of said first diffraction order beams is such that it subtends substantially 1 millimeter at a distance of substantially 3 milimeters from its corresponding background term convergence point.

* * * * *